United States Patent Office 2,810,721
Patented Oct. 22, 1957

2,810,721
QUATERNARY AMMONIUM COMPOUNDS

Earl W. Lane, Philadelphia, Pa., assignor to Rohm & Haas Company, Philadelphia, Pa., a corporation of Delaware No Drawing. Application July 28, 1955,
Serial No. 525,079

12 Claims. (Cl. 260—247.7)

This invention relates to bis(octyloxypentenyl)dialkyl-ammonium halides as new compositions of matter. It further concerns a method of preparation of these compositions.

The compounds of the present invention may be represented by the formula

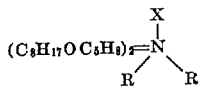

in which X is preferably a halogen atom having an atomic between about 35.5 and 127, i. e., chlorine, bromine, or iodine, and the R's, individually, represent a methyl or ethyl group and, collectively, represent a saturated divalent aliphatic chain of four to five atoms which jointly with the amino nitrogen forms a five- to six-sided mono-heterocyclic amine group.

The symbol X has been defined as preferably chlorine, bromine, or iodine. Chlorine is the preferred representation of X. It will be apparent to one skilled in the art that other anions may be employed such as sulfate, methylsulfate, phosphate, acetate, citrate, tartrate, and the like, which may be supplied directly or by metathesis with the halide form of the present compounds or by the use of an anion exchange resin.

The R's, taken singly, may represent an alkyl group of no more than two carbon atoms, that is, a methyl or ethyl group, in which case the R's may be the same or different. The R's, collectively and in conjunction with the amino nitrogen, may stand for a morpholino, thiamorpholino, pyrrolidinyl, or piperidino group, and these groups having a lower alkyl substituent, such as a methyl group.

The octyl group in the present compounds may be employed in any of the known spatial arrangements such as n-octyl, isooctyl, 1-methylheptyl, 5-methylheptyl, 2-ethyl-hexyl, 1,4-dimethylhexyl, 1,3-dimethylhexyl, 2-methyl-4-ethylpentyl, 2-ethyl-4-methylpentyl, and 2,2,4-trimethylpentyl. The pentenyl group, in the present compounds, is the normal straight chain arrangement with the double bond apparently in the 2 or 3 position.

The present compounds are preferably prepared by reacting octyloxypentenyl halide with dialkyloctyloxypentenylamine in equimolecular proportions to yield substantially quantitative results. These reactants are known or prepared by known methods. Illustrative methods of preparing typical reactants that may be employed to prepare the quaternary ammonium compounds of this invention are shown in the following preparations in which parts by weight are used throughout.

PREPARATION A

There are added to a reaction vessel 381.6 parts of n-octanol and 83.6 parts of paraformaldehyde. There are introduced over a period of two and a half hours a total of 104.5 parts of hydrogen chloride while the temperature of the reaction mixture is maintained at −10° to 10° C. The mixture is allowed to stand and form layers. The organic layer is separated from the aqueous layer and dried over anhydrous magnesium sulfate. The anhydrous organic layer is identified as n-octyloxymethyl chloride.

There is added to a reaction vessel 542.1 parts of n-octyloxymethyl chloride and 31.7 parts of anhydrous zinc chloride. There is slowly added butadiene while the temperature of the reaction mixture is maintained at 10° to 21° C. A total of 160 parts of butadiene is added over a period of two and a half hours. The reaction mixture is washed once with water, twice with aqueous 10% sodium carbonate, and once more with water. The product is dried over anhydrous magnesium sulfate and distilled at 110° to 125° C. at 2.3 mm. of pressure. The product has a chlorine content of 15.3% (15.2% theoretical) and corresponds to n-octyloxypentenyl chloride. There are also employed as above and with similar results the other isomeric forms of octyl alcohol, such as 1-methylheptanol, 5-methylheptanol, 2-ethylhexanol, 1,4-dimethylhexanol, 2-methyl-4-ethylpentanol, 1-methyl-3-heptanol, 2-ethyl-4-hexanol, 1,3-dimethylhexanol, and 2,2,4-trimethylpentanol.

PREPARATION B

Into a reaction vessel there are placed 46.4 parts of octyloxypentenyl chloride, 8 parts of sodium hydroxide, and 300 parts of aqueous 25% dimethylamine. The reaction mixture is heated at 70° to 85° C. for five hours after which the mixture is allowed to cool. Toluene is added to the reaction mixture. The mixture is agitated and then allowed to stratify. The toluene layer is washed with water and then distilled. The product distills at 110° to 120° C. at 1 mm. pressure and is identified as N,N-dimethyl-N-(octyloxypentenyl)amine. In a similar manner, N,N-diethyl-N-(octyloxypentenyl)amine is prepared from diethylamine and octyloxypentenyl chloride. In a similar manner, there is prepared N-(octyloxypentenyl)morpholine from octyloxypentenyl chloride and morpholine, N-(octyloxypentenyl)pyrrolidine from octyloxypentenyl chloride and pyrrolidine, and N-(octyloxypentenyl)piperidine from octyloxypentenyl chloride and piperidine.

Typical of the reactants that may be employed in the present reaction include octyloxypentenyl chloride, octyloxypentenyl bromide, octyloxypentenyl iodide, dimethyloctyloxypentenylamine, diethyloctyloxypentenylamine, methylethyloctyloxypentenylamine, octyloxypentenylmorpholine, octyloxypentenylpiperidine, octyloxypentenylthiamorpholine, and octyloxypentenylpyrrolidine.

The quaternary ammonium compounds of this invention are prepared by heating at a reacting temperature an octyloxypentenyl halide with a dialkyloctyloxypentenylamine. Temperatures in the range of about 50° to 150° C. are employed with a range of about 60° to 125° C. preferred. It is frequently advantageous to employ the reflux temperature when solvents are employed. Reaction times of about two to twenty-four hours are employed depending largely on the reaction temperature, use of solvent, and specific reactants employed. Either reactant may be used in excess, if desired, but the reaction occurs on a substantially equimolecular basis.

The present reaction is preferably conducted in the presence of a volatile inert organic solvent such as acetonitrile, dimethylformamide, nitromethane, toluene, xylene, benzene, isopropanol, butanol, isopropyl ether, and the like.

Completeness of reaction can be determined by the amount of ionizable halogen to be found in the reaction mixture. At the conclusion of the reaction the mixture is preferably washed with heptane, or the like, to remove any unreacted starting materials. The product is then isolated preferably by stripping off the volatile components under reduced pressure or on a steam bath.

The quaternary ammonium compounds of this invention are usually white or gray paste or wax like solids.

These compounds are particularly valuable as bactericides especially when used against *Micrococcus pyogenes* var. *aureus* and *Salmonella typhosa* as determined by standard phenol coefficient tests. The present compounds, in their various isomeric forms, produce values in the range of about 260 to 350 and above against *Salmonella typhosa* and 600 to 790 and above against *Micrococcus pyogenes* var. *aureus*. For instance, N,N-dimethyl-N-(octyloxypentenyl)ammonium chloride, in which the octyl group is in its 1-methylheptyl form, gave a value of 310 against *Salmonella typhosa* and 715 against *Micrococcus pyogenes*. The present compounds are also usefully fungicidal toward *Stemphylium sarcinaeforme* and *Monilinia fructicola* and exhibit valuable surface-active and cation-active wetting and emulsifying properties.

The quaternary ammonium compounds of this invention and the method for their preparation may be more fully understood from the following examples that are set forth by way of illustration and not by way of limitation, in which parts by weight are used throughout.

Example 1

There are added to a reaction vessel 21 parts of N,N-dimethyl-N-(octyloxypentenyl)amine, 18.5 parts of octyloxypentenyl chloride, and 50 parts of acetonitrile. The reaction mixture is heated at 60° to 70° C. for six hours. The mixture is allowed to cool and is then washed with heptane. The volatile components are stripped off leaving the product which has a chlorine content of 8.0% (theoretical 7.6%) and a nitrogen content of 3.2% (theoretical 3.0%). The ratio of chlorine content to nitrogen content is 2.6 (theoretical 2.5). The product corresponds to N,N-dimethyl-N,N-bis(octyloxypentenyl)ammonium chloride.

In a similar way, there is prepared N,N-diethyl-N,N-bis(octyloxypentenyl)ammonium iodide by reacting octyloxypentenyl iodide with N,N-diethyl-N-(octyloxypentenyl)amine.

Example 2

There are introduced into a reaction vessel 27.7 parts of octyloxypentenyl bromide, 28.3 parts of octyloxypentenylmorpholine, and 75 parts of isopropanol. The reaction mixture is heated at reflux for eight hours and then cooled and washed with heptane. The volatile components are stripped off leaving the product which corresponds to bis(octyloxypentenyl)morpholinium bromide.

In like manner, from octyloxypentenyl chloride and octyloxypentenylthiamorpholine, there is prepared bis-(octyloxypentenyl)thiamorpholinium chloride.

Example 3

There are reacted in a reaction vessel 23.3 parts of octyloxypentenyl chloride and 26.7 parts of octyloxypentenylpyrrolidine, in the presence of 60 parts of isopropyl ether. The mixture is heated at 72° to 76° C. for seven hours. The reaction mixture is allowed to cool to room temperature. Heptane is added for washing purposes and is then stripped off along with other volatile components. The product remains as the residue and corresponds to bis(octyloxypentenyl)pyrrolidinium chloride.

There is prepared in an analogous way bis(octyloxypentenyl)piperidinium bromide from octyloxypentenyl bromide and octyloxypentenylpiperidine.

Example 4

There are introduced into a reaction vessel 23.3 parts of octyloxypentenyl chloride, 25.5 parts of N-methyl-N-ethyl-N-(octyloxypentenyl)amine, and 70 parts of acetonitrile. The mixture is refluxed for ten hours and then, after cooling, is washed with heptane. The product is isolated as the residue by stripping off the volatile components. The product corresponds to N-methyl-N-ethyl- N,N-bis(octyloxypentenyl)ammonium chloride and may be represented by the formula

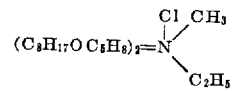

There is also prepared N,N-dimethyl-N,N-bis(octyloxypentenyl)ammonium phosphate by passing the corresponding halide form of the quaternary ammonium compound through a bed of chloromethylated and aminated styrene-divinyl benzene anion-exchange resin in free base form and then titrating with phosphoric acid. The same compound is prepared by first converting the anion-exchange resin to the phosphate form and then passing the chloride form of the quaternary ammonium compound through a bed of the anion-exchange resin in phosphate form. The sulfate form of the present quaternary ammonium compounds are made in like manner.

The compounds of the present invention are valuable as detergent-sanitizers, in which applications they may be employed in dairy farms to sanitize dairy equipment and utensils, in meat plants to sanitize cutting tables, grinders, and the like, and in fruit processing operations for instance, to wash and sanitize oranges. A suitable detergent-sanitizer for use with dairy equipment includes, by weight, 10% of a quaternary ammonium compound of this invention, 10% of octylphenoxypolyethoxyethanol, 7% of trisodium phosphate, and 73% of water. One ounce of this solution is used per four gallons of water. For use in meat plants, there may be used 5% of a compound of this invention, 2.5 to 5.0% of octylphenoxypolyethoxyethanol, 20 to 40% soda ash, 20 to 40% sodium metasilicate, and the remainder sodium tripolyphosphate. One ounce of this formulation is used per gallon of water. The orange wash is preferably 1 part of a present compound in 5000 parts of water. The present compounds may also be used in aqueous solution as a final diaper rinse to prevent diaper rash, preferably using about 0.5 to 1 ounce of a present compound per hundred pounds of fabric, based on its dry weight.

I claim:

1. A method for the preparation of a quaternary ammonium compound having the formula

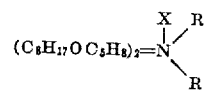

which comprises heating in the temperature range of about 50° to 150° C. and thereby causing to react in substantially equimolecular proportions a compound having the formula $C_8H_{17}OC_5H_8X$ with one having the formula $C_8H_{17}OC_5H_8NRR$, in which said —$C_5H_8$— group is aliphatic in structure, said R groups taken separately are alkyl groups of one to two carbon atoms and taken together with the nitrogen atom form a heterocyclic group selected from the group consisting of morpholino, thiamorpholino, piperidino, and pyrrolidinyl, and X is a member from the group consisting of chloride, bromide, iodide, methylsulfate, citrate, tartrate, acetate, and equivalents of sulfate and phosphate.

2. A method for the preparation of a quaternary ammonium compound having the formula

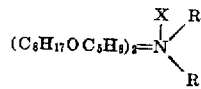

which comprises heating in the presence of a volatile inert organic solvent in the temperature range of about 50° C. to the reflux temperature of the reaction mixture and thereby causing to react in substantially equimolecular proportions a compound having the formula $C_8H_{17}OC_5H_8X$ with one having the formula $C_8H_{17}OC_5H_8NNR$ in which said —$C_5H_8$— group is aliphatic in structure, said R groups taken separately are alkyl groups of one to two carbon atoms and taken together with the nitrogen atom form a heterocyclic group selected from the group consisting of morpholino, thiamorpholino, piperidino, and pyrrolidinyl, and X is a member from the group consisting of chloride, bromide, iodide, methylsulfate, citrate, tartrate, acetate, and equivalents of sulfate and phosphate.

3. A method for the preparation of the quaternary ammonium compound having the formula

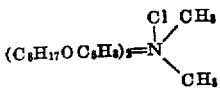

which comprises heating, in the presence of a volatile inert organic solvent at a reacting temperature and thereby causing to react in substantially equimolecular proportions in the range of about 60° to 125° C., octyloxypentenyl chloride and dimethyloctyloxypentenylamine.

4. A method for the preparation of the quaternary ammonium compound having the formula

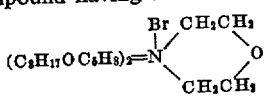

which comprises heating, in the presence of a volatile inert organic solvent at a reacting temperature and thereby causing to react in substantially equimolecular proportions in the range of about 60° to 125° C., octyloxypentenyl bromide and octyloxypentenylmorpholine.

5. A method for the preparation of the quaternary ammonium compound having the formula

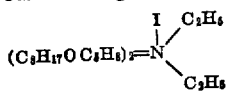

which comprises heating, in the presence of a volatile inert organic solvent at a reacting temperature and thereby causing to react in substantially equimolecular proportions in the range of about 60° to 125° C., octyloxypentenyl iodide and diethyloctyloxypentenylamine.

6. As a new composition of matter the quaternary ammonium compound having the formula

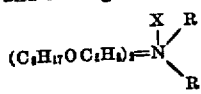

in which said —$C_5H_8$— group is aliphatic in structure, said R groups taken separately are alkyl groups of one to two carbon atoms and taken together with the nitrogen atom form a heterocyclic group selected from the group consisting of morpholino, thiamorpholino, piperidino, and pyrrolidinyl, and X is a member from the group consisting of chloride, bromide, iodide, methylsulfate, citrate, tartrate, acetate, and equivalents of sulfate and phosphate.

7. As a new composition of matter the quaternary ammonium compound having the formula

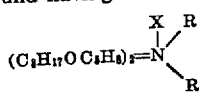

in which said —$C_5H_8$— group is aliphatic in structure, R represents an alkyl group of one to two carbon atoms, and X is a halogen atom having an atomic weight of about 35.5 to 127.

8. As a new composition of matter, N,N-dimethyl-N,N-bis(octyloxypentenyl)ammonium chloride.

9. As a new composition of matter, bis(octyloxypentenyl) morpholinium bromide.

10. As a new composition of matter, N,N-diethyl-N,N-bis(octyloxypentenyl)ammonium iodide.

11. As a new composition of matter, bis(octyloxypentenyl)piperidinium bromide.

12. As a new composition of matter, N-menthyl-N-ethyl-N,N-bis(octyloxypentenyl)ammonium chloride.

References Cited in the file of this patent

UNITED STATES PATENTS 2,087,132    Taub et al.  ------------ July 13, 1937

UNITED STATES PATENT OFFICE

CERTIFICATE OF CORRECTION

Patent No. 2,810,721                                                            October 22, 1957

Earl W. Lane

It is hereby certified that error appears in the printed specification of the above numbered patent requiring correction and that the said Letters Patent should read as corrected below.

Column 4, line 75, for the formula "$C_8H_{17}OC_5H_8NNR$" read

-- $C_8H_{17}OC_5H_8NRR$ --.

Signed and sealed this 3rd day of December 1957.

(SEAL)
Attest:

KARL H. AXLINE                                                           ROBERT C. WATSON
Attesting Officer                                                   Commissioner of Patents